(12) United States Patent
Karaki et al.

(10) Patent No.: US 7,950,712 B2
(45) Date of Patent: *May 31, 2011

(54) DECK BOARD AND MOUNTING STRUCTURE OF DECK BOARD

(75) Inventors: Tatsuya Karaki, Aichi-ken (JP); Mikihiro Kito, Ichinomiya (JP)

(73) Assignee: Toyota Boshoku Kabushiki Kaisha, Aichi-Ken (JP)

(*) Notice: Subject to any disclaimer, the term of this patent is extended or adjusted under 35 U.S.C. 154(b) by 73 days.

This patent is subject to a terminal disclaimer.

(21) Appl. No.: 12/359,644

(22) Filed: Jan. 26, 2009

(65) Prior Publication Data

US 2009/0295184 A1    Dec. 3, 2009

(30) Foreign Application Priority Data

May 28, 2008    (JP) .................................. 2008-139992

(51) Int. Cl.
*B60R 5/04* (2006.01)
(52) U.S. Cl. ................ 296/37.16; 296/37.14; 296/37.1; 296/37.8; 224/542; 248/291.1
(58) Field of Classification Search ................ 296/37.1, 296/37.2, 37.5, 37.8, 37.14, 37.16, 26.04, 296/26.06, 26.07, 39.1, 191, 124; 248/291.1, 248/292.11, 351, 352; 224/542
See application file for complete search history.

(56) References Cited

U.S. PATENT DOCUMENTS

| | | | | |
|---|---|---|---|---|
| 4,718,584 A | * | 1/1988 | Schoeny | 224/42.34 |
| 5,810,413 A | * | 9/1998 | Siring et al. | 296/37.5 |
| 6,247,741 B1 | * | 6/2001 | Seel et al. | 296/37.14 |
| 6,733,060 B1 | * | 5/2004 | Pavkov et al. | 296/37.16 |
| 6,811,196 B2 | * | 11/2004 | Gammon | 296/37.1 |
| 7,661,742 B2 | * | 2/2010 | Medlar et al. | 296/37.16 |
| 2003/0222475 A1 | | 12/2003 | Nakamitsu et al. | |
| 2007/0252401 A1 | * | 11/2007 | Sumida et al. | 296/37.5 |

FOREIGN PATENT DOCUMENTS

| | | |
|---|---|---|
| DE | 10260524 | 7/2004 |
| DE | 202006007784 | 9/2006 |
| DE | 102007042371 | 3/2009 |
| JP | 2007-191127 A | 8/2007 |
| JP | 4038775 B2 | 11/2007 |
| WO | 03/104035 A1 | 12/2003 |

OTHER PUBLICATIONS

English language Abstract and translation of JP 2007-191127 A, Feb. 8, 2007.
English language translation of JP 4038775 B2, Nov. 16, 2007.
English language Abstract of DE 10260524, Jul. 15, 2004.
English language Abstract of DE 102007042371, Mar. 12, 2009.

* cited by examiner

*Primary Examiner* — Glenn Dayoan
*Assistant Examiner* — SunSurraye Westbrook
(74) *Attorney, Agent, or Firm* — Greenblum & Bernstein, P.L.C.

(57) ABSTRACT

A deck board includes a board body arranged in a luggage area of a vehicle so as to be capable of being moved between an upper position and a lower position. The board body in the upper position separates the luggage area into upper and lower areas. The deck board further includes a front support portion that is rotatably connected to the front end portion of the board body via a hinge portion so as to guide the board body being moved between the upper and lower positions. The end portion of the front support portion on the opposite side of the hinge portion is pivotally supported by the sidewalls of the luggage area via a support pin. Further included is a spring unit arranged to bias the board body and the front support portion to be drawn to each other across the hinge portion.

20 Claims, 18 Drawing Sheets

US 7,950,712 B2

DECK BOARD AND MOUNTING STRUCTURE OF DECK BOARD

CROSS REFERENCE TO RELATED APPLICATION

The present application is based on and incorporates herein by reference Japanese Patent Application No. 2008-139992 filed on May 28, 2008.

FIELD OF THE INVENTION

The present invention relates to a deck board arranged to separate a luggage area of a vehicle into upper and lower, and further relates to a mounting structure of the deck board.

BACKGROUND OF THE INVENTION

A mounting structure of a deck board, described in JP-A-2007-191127, is known as an example, in which the deck board is supported by a link mechanism so as to be capable of movement between upper and lower positions. The link arms of the link mechanism are arranged on the respective sidewalls of the luggage area. A support pin is provided on the distal end of each link arm so as to project into the vehicle interior. On the other hand, a bearing device for rotatably supporting the support pin projecting into the vehicle interior is bolted to the underside of the deck board.

However, according to the above mounting structure, the components of the link mechanism should be arranged on the underside of the deck board and the sidewalls of the luggage area. Further, the components on the two sides should be linked when the deck board is mounted in the luggage area. Particularly, circular-arc grooves, for allowing the support pins to penetrate, should be formed through base plates mounted to the sidewalls of the luggage area. Thus, the number of components may be increased, and the mounting operation may be complicated.

SUMMARY OF THE INVENTION

The present invention was made in view of the foregoing circumstances, and an object thereof is to simplify a mechanism for moving a deck board between upper and lower positions so that the number of components is reduced, and further to facilitate the mounting operation for the deck board.

A deck board according to the present invention includes a board body arranged in a luggage area of a vehicle so as to be capable of being moved between an upper position and a lower position. The board body in the upper position separates the luggage area into upper and lower areas. The board body in the lower position is arranged on the side of the floor of the luggage area.

The deck board further includes a guiding member that is rotatably connected to the front end portion of the board body via a hinge portion so as to guide the board body being moved between the upper position and the lower position. The end portion of the guiding member on the opposite side of the hinge portion is pivotally supported by sidewalls on lateral sides of the luggage area via a support pin.

Further included is a biasing member arranged to bias the board body and the guiding member to be drawn to each other across the hinge portion. The end portions of the biasing member are rotatably connected to the inner surface of the board body and the inner surface of the guiding member, respectively.

According to the construction, the guiding member is pivotally supported on the support pin, and thereby the front end portion of the board body can be rotated via the hinge portion. This enables the board body to be moved between the upper position and the lower position.

The biasing member is arranged on the inner surface side of the deck board. Thereby, the board body can be formed of a single flat board, and the biasing member can be hidden behind the deck board. Accordingly, the movement of the deck board between the upper and lower positions can be achieved without disfigurement of the luggage area.

The operation of the biasing member will be described briefly. When the board body is in the upper position, the inner surface of the board body and the inner surface of the guiding member are biased to be drawn to each other across the hinge portion. If the board body is pulled rearward, the arrangement changes so that the guiding member and the board body together form a single flat board. Thereafter, the guiding member and the board body will continue to move due to the inertial force, and consequently the outer surface of the board body and the outer surface of the guiding member become biased to be drawn to each other across the hinge portion.

According to the above construction, the mechanism for moving the board body between the upper and lower positions is not required to be arranged on both of the deck board and the sidewalls of the luggage area. Consequently, the mounting operation for the deck board can be facilitated. Further, the mechanism for moving the board body between the upper and lower positions is simplified, and thereby the number of components can be reduced.

The following constructions are preferable according to some aspects of the present invention.

The biasing member can be formed of a spring unit that includes a pair of plate members, which are rotatably connected to each other via a flexible portion, and further includes a spring member arranged to bias the plate members to be drawn to each other.

According to the construction, the biasing member can be treated as a spring unit, and thereby the deck board can be readily mounted by connecting the pair of plate members to the inner surface of the board body and the inner surface of the guiding member, respectively.

The biasing member may be formed of a leaf spring that is substantially U-shaped in a free state. According to the construction, the biasing member is formed of a simple member, i.e., a leaf spring, and therefore the number of components can be reduced.

According to the present invention, a mounting structure of a deck board can include a deck board described above, and a rear support portion provided on the rear wall on the rear side of the luggage area so as to support the rear side of the board body in the upper position. The support pin can be detachably supported on the sidewalls of the luggage area.

According to the construction, the deck board can be readily mounted to the sidewalls of the luggage area.

The guiding member can be arranged in a vertical position so as to be along the front wall on the front side of the luggage area, when the board body is in the upper position. According to the construction, the front side of the board body in the upper position can be supported by the guiding member.

An escape recess may be provided at a corner formed by the bottom surface of the luggage area and the front wall of the luggage area, so as to accommodate the biasing member when the board body is in the lower position.

According to the construction, when the board body is in the lower position, the escape recess accommodates the biasing member, and therefore the board body can be supported by the bottom surface of the luggage area.

According to the present invention, a mechanism for moving a deck board between upper and lower positions can be simplified, resulting in reduction of the number of components. Further, the mounting operation for the deck board can be facilitated.

BRIEF DESCRIPTION OF THE DRAWINGS

The above and other features and advantages of the present invention will become more apparent from the following detailed description made with reference to the accompanying drawings. In the drawings.

DETAILED DESCRIPTION OF THE INVENTION

Embodiment 1

Figure 1:
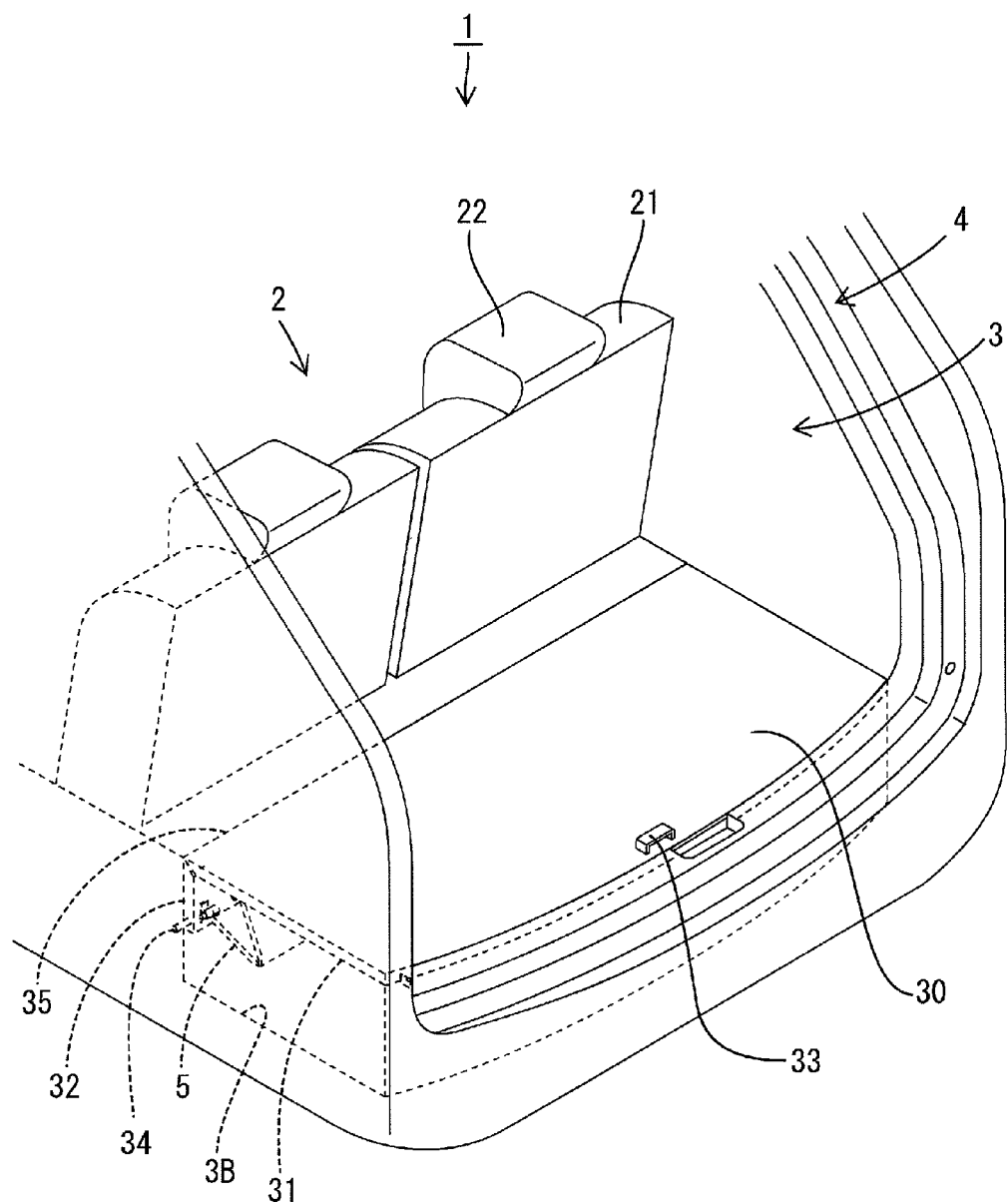
FIG. 1 is a rear perspective view of a luggage area according to an embodiment 1.

An embodiment 1 according to the present invention will be hereinafter explained with reference to FIGS. 1 to 8. FIG. 1 is a rear perspective view of a vehicle 1 having a rear door (not shown), such as a minivan or a station wagon. In the vehicle 1, a luggage area 3 is provided on the rear side of the rear seats 2. Further, a rear opening 4 is provided on the rear side of the luggage area 3 when the rear door is opened. A luggage can be put in the luggage area 3 through the rear opening 4.

Figure 6:
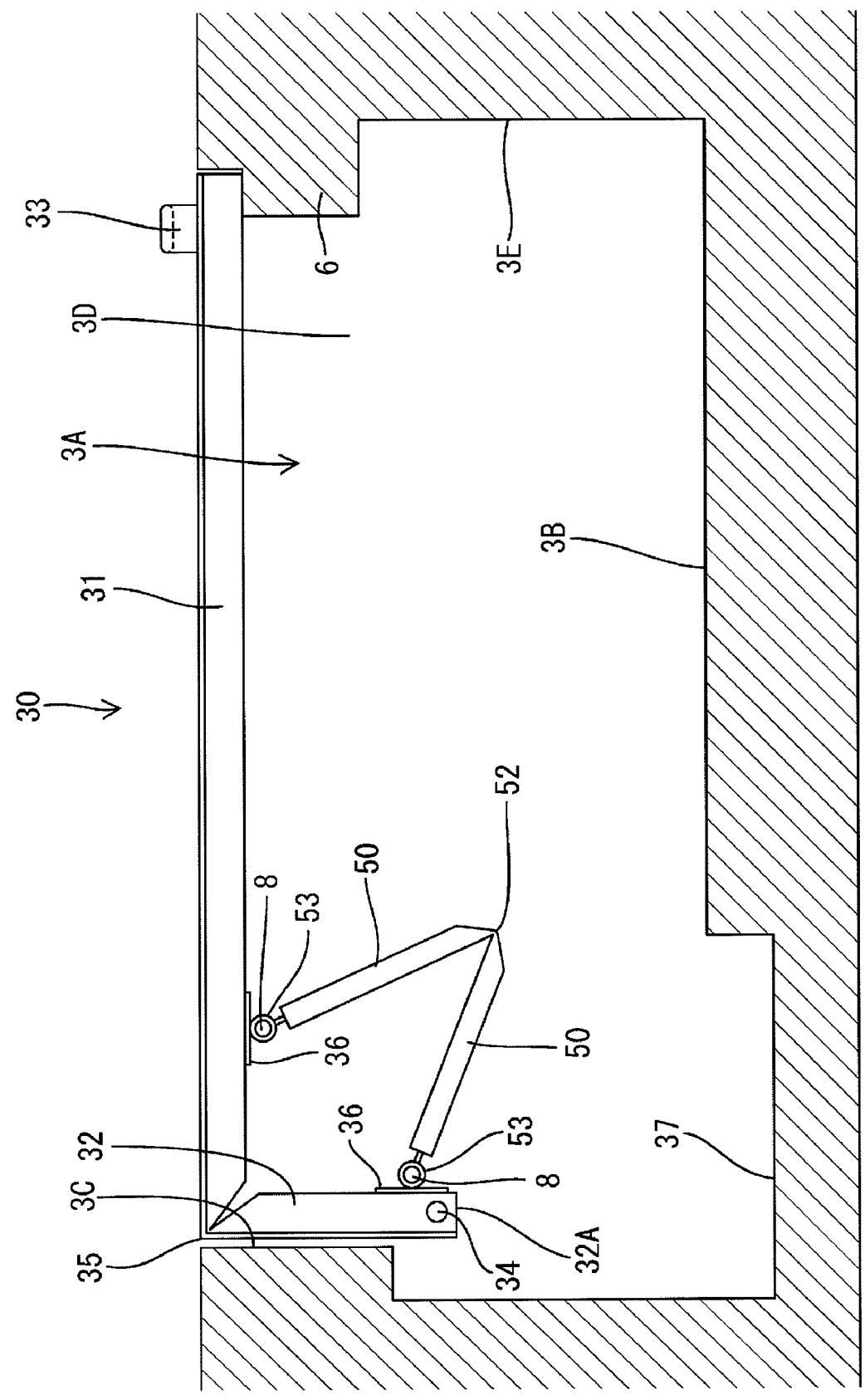
FIG. 6 is a cross-sectional side view showing the deck board arranged in the upper position.
Figure 8:
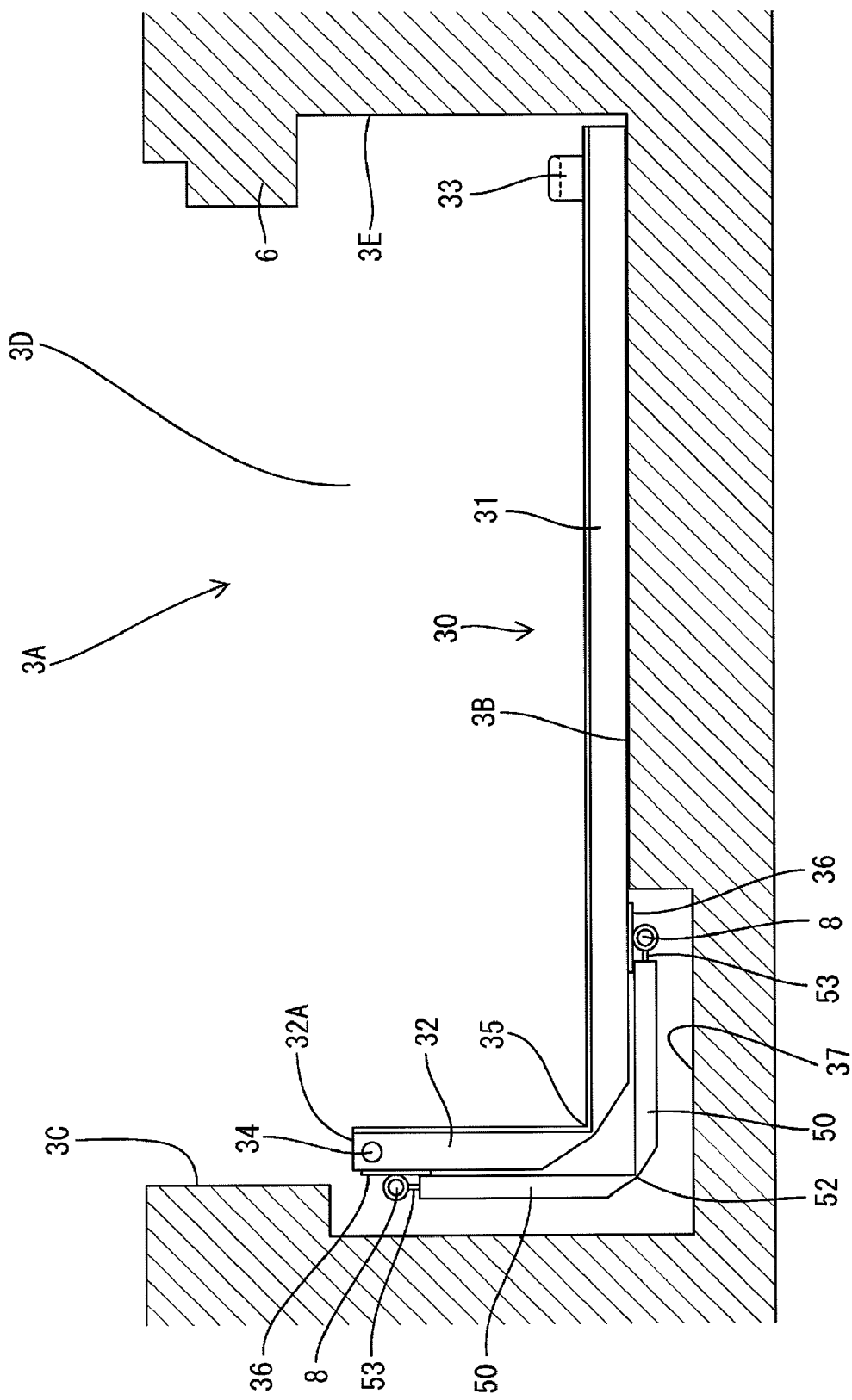
FIG. 8 is a cross-sectional side view showing the deck board arranged in the lower position.

The luggage area 3 can be separated into two areas, i.e., an upper area and a lower area, by a deck board 30 arranged in an upper position (as shown in FIG. 6). When the deck board 30 rests in a lower position (as shown in FIG. 8), a large luggage area is provided so that a bulky luggage can be carried therein. Hereinafter, the lower luggage area, when the luggage area 3 is separated into upper and lower areas, is referred to as a storage space 3A.

The rear seats 2 are provided as a split-folding seat, which include backrests 21 for supporting the backs and waists of seat occupants (not shown), and further includes headrests 22 for supporting the heads of the seat occupants. Reclining mechanisms (not shown) are provided on the rear seats 2, in order to enable adjustment of the angles of the backrests 21.

If the backrest 21 is folded forward, the luggage area 3 is extended so that a bulky luggage can be carried therein. The top surface of the deck board 30 in the upper position can be flush with the rear surface of the folded backrest 21.

Referring to FIG. 6, the deck board 30 in the upper position is located at a predetermined height from a floor 3B (i.e., an example of "a bottom surface (of a luggage area)" of the present invention) that forms the underside of the storage space 3A. The deck board 30 is held in a horizontal position, so that the top surface thereof is level with the lower end of the rear opening 4 as shown in FIG. 1. Thereby, a luggage on the top surface of the deck board 30 can be easily taken out.

The floor 3B forms a flat surface, which can be provided as a part of the vehicle body, or alternatively, can be formed of a plate made of a synthetic resin material or wood-based material.

Figure 2:
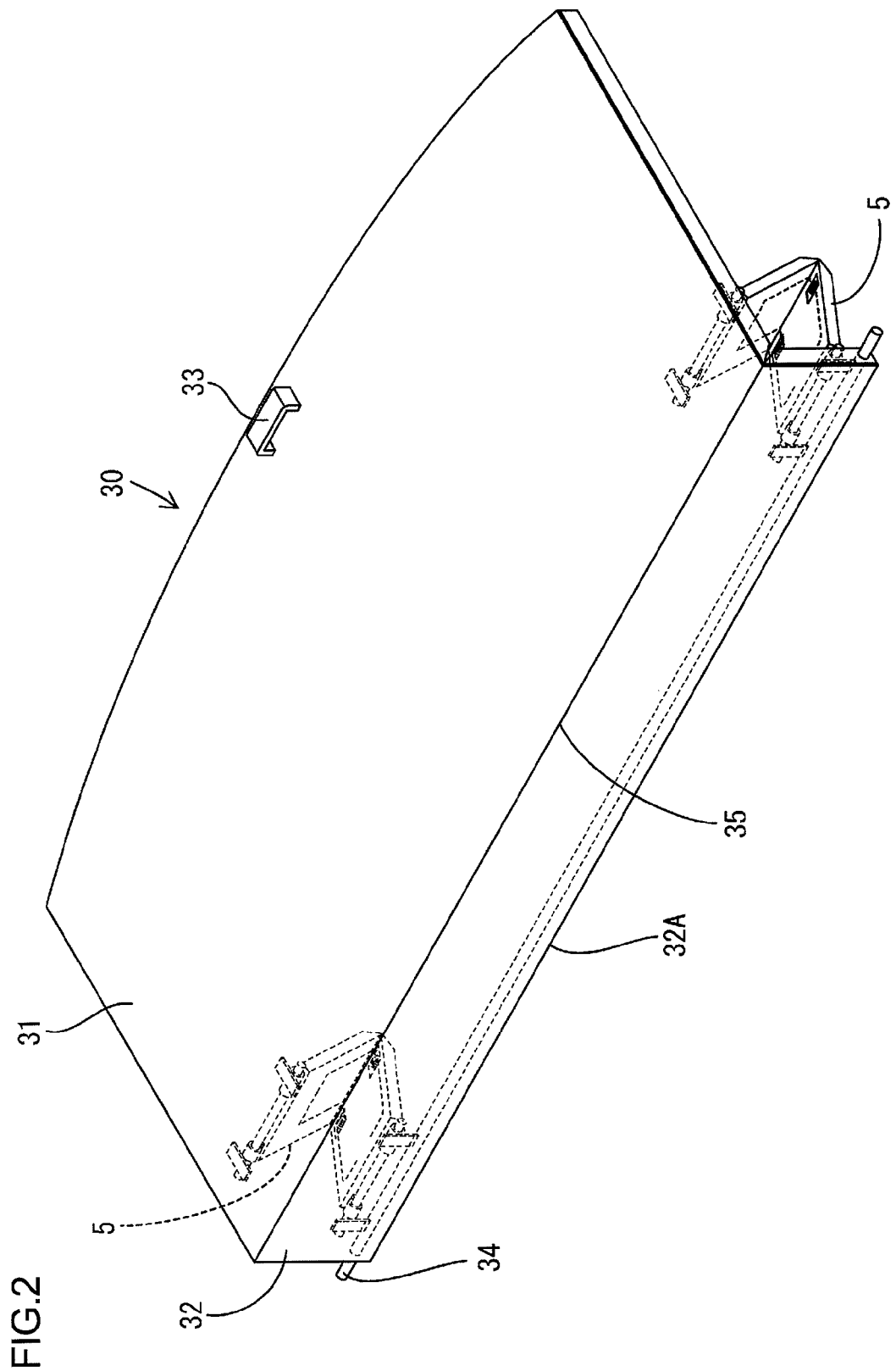
FIG. 2 is a perspective view showing the top surface of a deck board arranged in the upper position.

Referring to FIG. 2, the deck board 30 includes a board body 31 formed of a single flat board, and a front support portion 32 (i.e., an example of "a guiding member" of the present invention) that is rotatably connected to the front end portion of the board body 31 via a hinge portion 35 having flexibility. Further included is a handle portion 33 attached to the rear end area of the top surface of the board body 31.

A support pin 34, extending in the vehicle width direction, penetrates the fore end portion 32A (i.e., the end portion on the opposite side of the hinge portion 35) of the front support portion 32. Thereby, the front support portion 32 is pivotally supported. The end portions of the support pin 34 are detachably supported on receiving portions (not shown) provided on the sidewalls 3D on the lateral sides of the storage space 3A.

Hereinafter, a portion of any component that is positioned at one end thereof in the vehicle width direction, or a side of that portion, is referred to as "a lateral side of the component".

Figure 3:
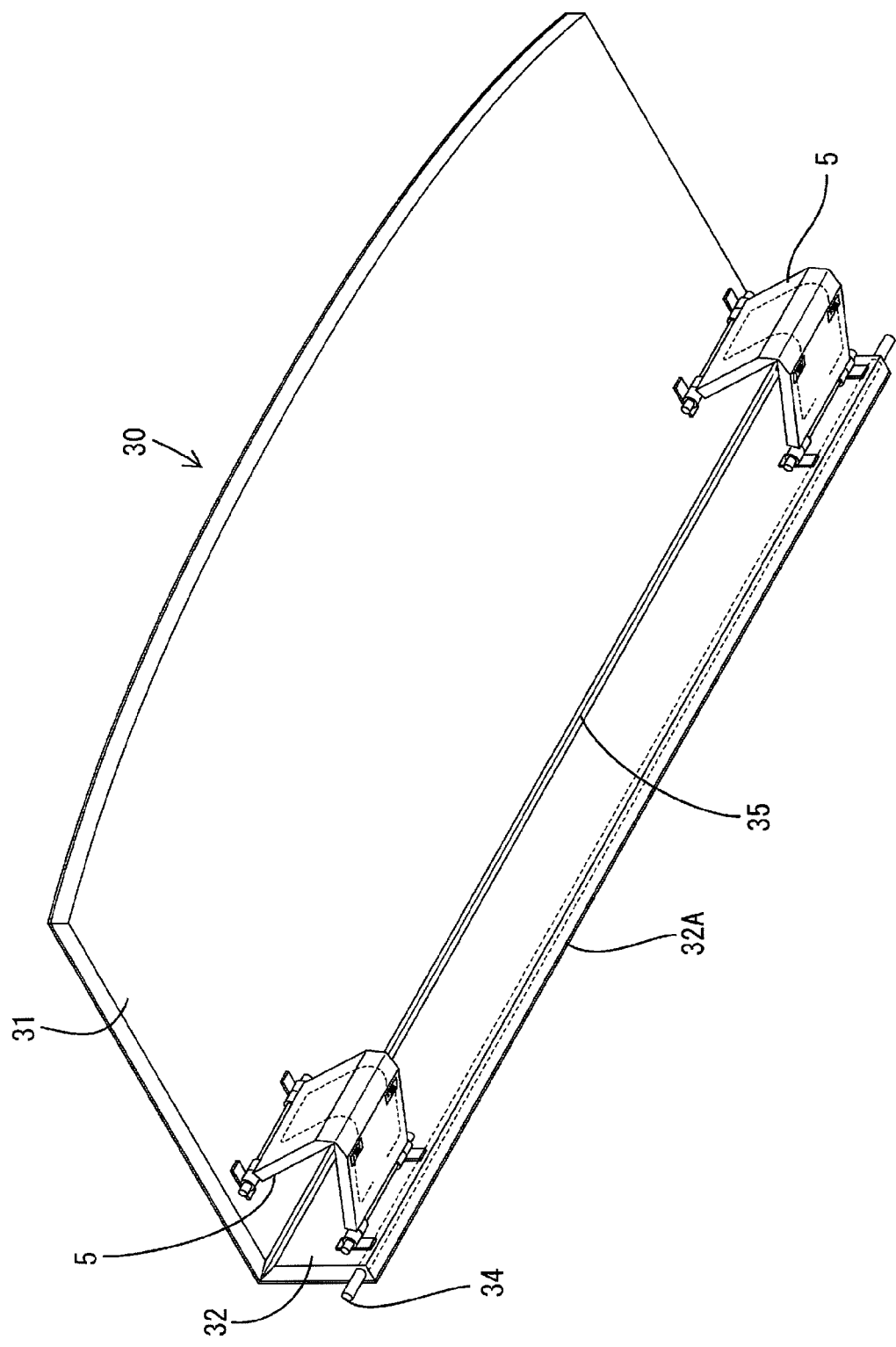
FIG. 3 is a perspective view showing the underside surface of the deck board arranged in the upper position.
Figure 4:
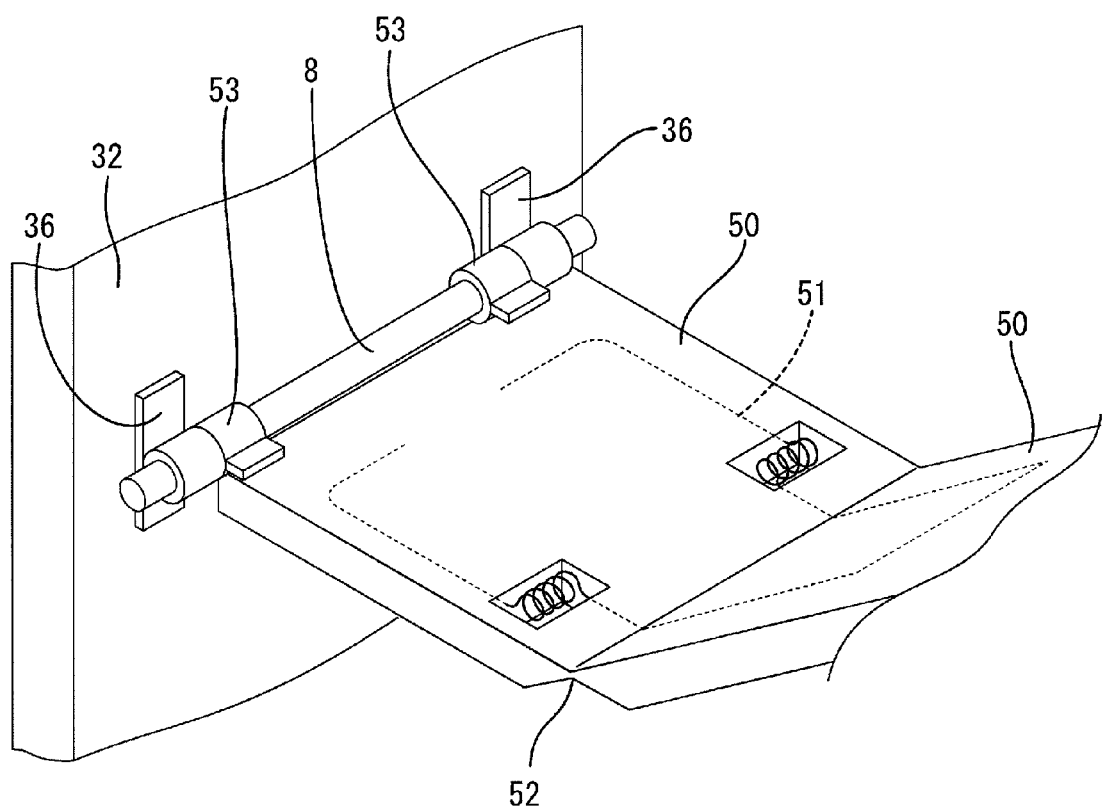
FIG. 4 is a perspective view showing a connecting structure for a plate member of a spring unit.

On the underside surface of the deck board 30, as shown in FIG. 3, a pair of spring units 5 (i.e., an example of "a biasing member" of the present invention) are provided on the lateral sides thereof. Referring to FIG. 4, each spring unit 5 includes a pair of plate members 50, which are connected to each other by a flexible portion 52, and further includes a spring member 51 (e.g., a torsion spring) embedded in the plate members 50.

On the underside of the deck board 30, each spring unit 5 is arranged across the hinge portion 35 so as to bypass the hinge portion 35. The plate members 50 are normally biased by the spring member 51, so as to fold along the flexible portion 52. According to the construction, the spring units 5 are hidden behind the board body 31 or the front support portion 32, when viewed from the top side of the deck board 30. Thus, disfigurement of the luggage area 3 can be prevented.

Due to the spring units 5 thus constructed, the underside surface of the board body 31 and the rear surface of the front support portion 32 are biased to be drawn to each other across the hinge portion 35 as shown in FIG. 3, when the deck board 30 is arranged in the upper position. The underside surface of the board body 31 is an example of "an inner surface of a deck board" of the present invention. The rear surface of the front support portion 32, when the deck board 30 is arranged in the upper position, is an example of "an inner surface of a front support portion" of the present invention.

Figure 5:
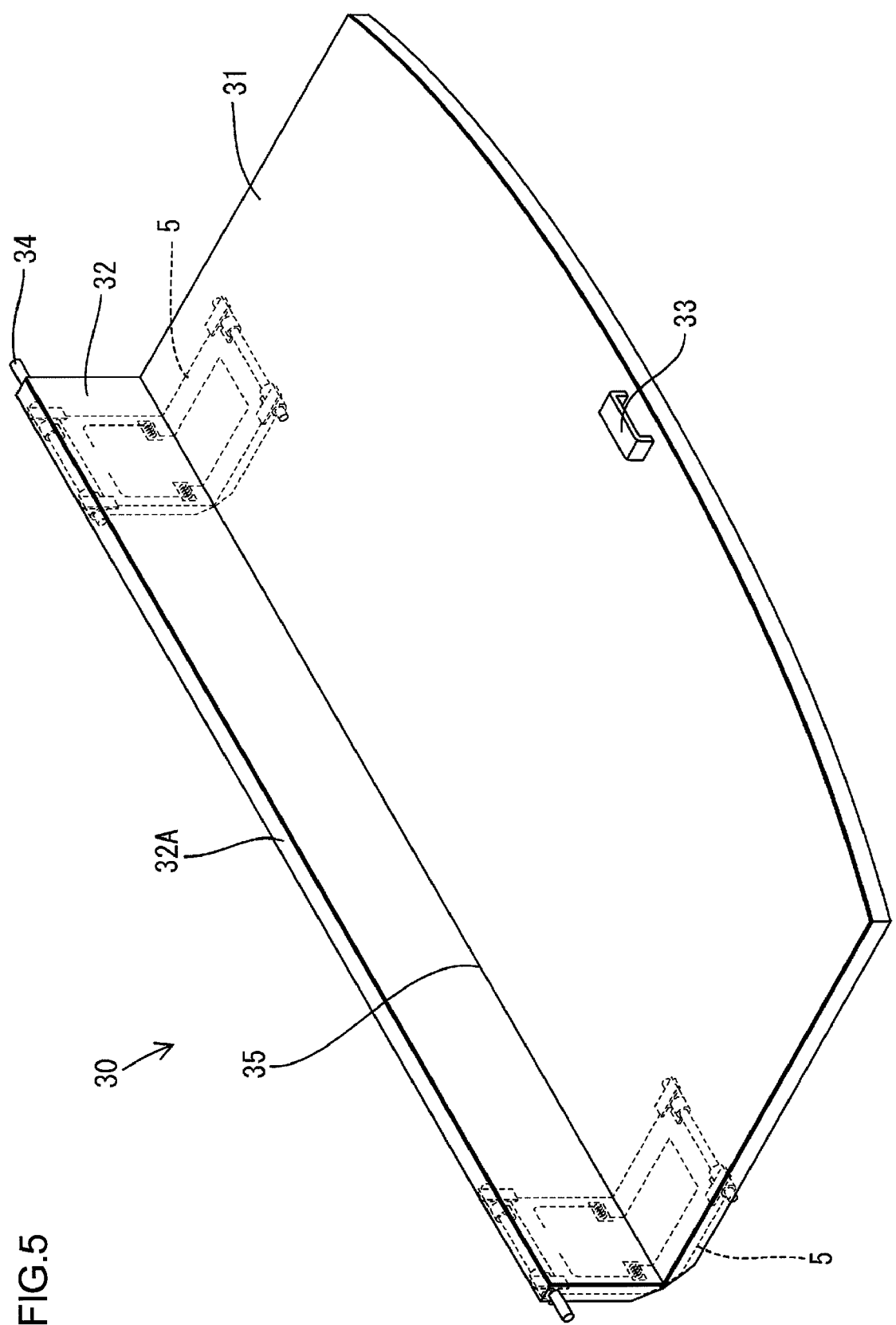
FIG. 5 is a perspective view showing the top surface of the deck board arranged in the lower position.

When the deck board 30 is arranged in the lower position, the top surface of the board body 31 and the front surface of the front support portion 32 are biased to be drawn to each other across the hinge portion 35 as shown in FIG. 5. The front surface of the front support portion 32, when the deck board 30 is arranged in the lower position, is an example of "an inner surface of a front support portion" of the present invention.

The connecting structure for the plate member 50 is common to both plate members 50. Therefore, the following explanation will be made with reference to FIG. 4, pointing to the connecting portion for connecting the plate member 50 to the rear(inner) surface of the front support portion 32, as a representative.

The plate member 50 includes a pair of mounting portions 53, which are arranged spaced apart along the vehicle width direction. A pair of support portions 36 are provided on the rear(inner) surface of the front support portion 32, so as to be arranged lateral to the respective mounting portions 53.

Insert holes are formed through the mounting portions 53 and the support portions 36, and a support shaft 8 is inserted into the insert holes. The insert holes are coaxially arranged, and thereby the mounting portions 53 and the support portions 36 are rotatably supported on the single support shaft 8.

Thus, the plate member 50 is rotatably connected to the rear(inner) surface of the front support portion 32 by using the support shaft 8, the mounting portions 53 and the support portions 36.

The deck board 30 of the present embodiment can be moved between the upper position and the lower position, as described above. The deck board 30 in the upper position separates the luggage area 3 of the vehicle 1 into upper and lower areas. The deck board 30 in the lower position rests on the floor 3B of the storage space 3A.

FIG. 6 shows the deck board 30 arranged in the upper position. In order to support the rear end portion of the board body 31 in the upper position, a rear support portion 6 is provided on the rear wall 3E on the rear side of the storage space 3A, so as to protrude forward. That is, the board body 31 in the upper position is supported at two points, i.e., at front and rear points, by the front support portion 32 and the rear support portion 6, respectively.

On the other hand, FIG. 8 shows the deck board 30 arranged in the lower position. Escape recesses 37 for accommodating the respective spring units 5 are formed on the front wall 3C and the floor 3B of the storage space 3A as shown in FIG. 8, so as to correspond to the spring units 5 (i.e., the escape recesses 37 are positioned at the corner formed by the floor 3B and the front wall 3C in the luggage area 3).

According to the construction, the board body 31 in the lower position can be supported by the whole surface of the floor 3B of the luggage area 3.

When the board body 31 is set in the upper position, the front support portion 32 is arranged in a vertical position so as to be along the front wall 3C on the front side of the storage space 3A, as shown in FIG. 6. The fore end portion 32A of the front support portion 32 is pivotally supported by the support pin 34. Therefore, the hinge portion 35 can rotate around the axis of the support pin 34, when the board body 31 is moved from the upper position to the lower position.

When the board body 31 is set in the lower position, the front support portion 32 is also arranged in a vertical position, as shown in FIG. 8, and the fore end portion 32A of the front support portion 32 is pivotally supported by the support pin 34.

In the present embodiment, due to the utilization of elastic forces of the spring units 5, the deck board 30 can be readily moved from the upper position to the lower position in order to rest the deck board 30 on the floor 3B, and can be readily moved from the lower position to the upper position in order to separate the luggage area 3 into upper and lower areas. The operation will be hereinafter explained.

Figure 7:
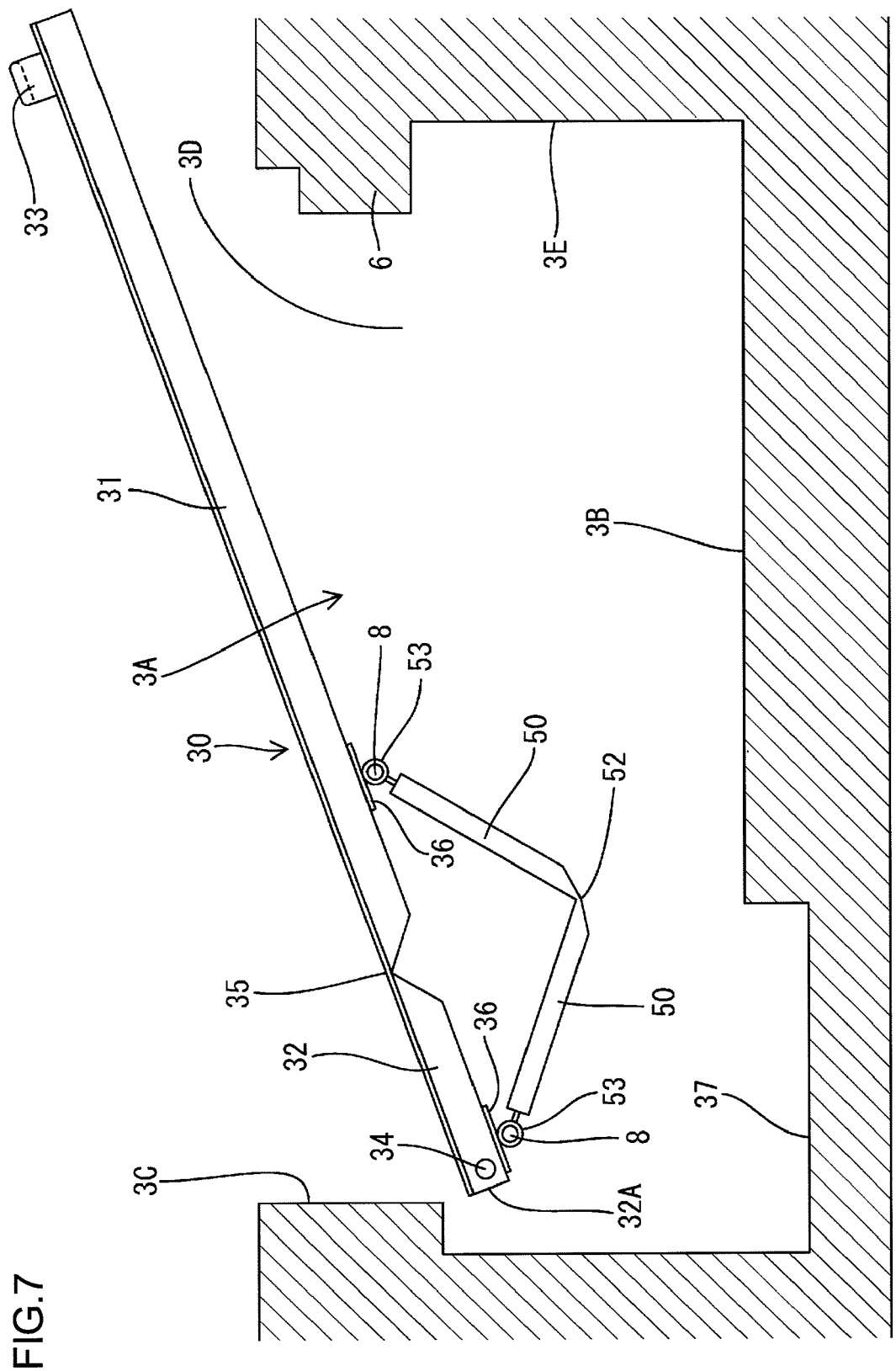
FIG. 7 is a cross-sectional side view showing the deck board that is pulled out so as to form a flat board protruding rearward.

First, when the deck board 30 is moved from the upper position to the lower position, the handle portion 33 of the deck board 30 in a state shown in FIG. 6 is grasped and pulled rearward so that the board body 31 is pulled out against the elastic forces of the spring units 5. Then, the front support portion 32 rotates around the axis of the support pin 34, and the deck board 30 becomes flat as shown in FIG. 7.

Thereafter, the front support portion 32 will continue to rotate due to the inertial force, so that the hinge portion 35 moves to approach the floor 3B. The hinge portion 35 is further pulled toward the floor 3B due to the elastic forces of the spring units 5, while the front support portion 32 rotates to approach the front wall 3C of the storage space 3A due to the weight of the board body 31 received via the hinge portion 35.

When the handle portion 33 is thereafter released, the board body 31 rotates around the hinge portion 35 so as to move downward due to its own weight. Consequently, the board body 31 rests on the floor 3B as shown in FIG. 8.

Thus, the deck board 30 can be moved from the upper position to the lower position, simply by pulling out the board body 31 so that the front support portion 32 and the board body 31 together form a single flat board protruding rearward.

Thereafter, the front support portion 32 automatically moves to approach the front wall 3C of the storage space 3A, due to the elastic forces of the spring units 5 and the weight of the board body 31. Then, the board body 31 can be dropped on the floor 3B when the handle portion 33 is released, resulting in the deck board 30 in the lower position.

The deck board 30 can be moved from the lower position to the upper position in a similar manner. That is, as described above, the handle portion 33 is pulled upward and rearward, so that the deck board 30 transfers to a state shown in FIG. 7.

Then, the hinge portion 35 will continue to rotate due to the inertial force, so as to approach the front wall 3C of the storage space 3A. Consequently, the front support portion 32 is arranged in a vertical position so as to be along the front wall 3C, further due to the elastic forces of the spring units 5.

If the handle portion 33 is released, the board body 31 rotates around the hinge portion 35 so as to approach the floor 3B. Then, the deck board 30 is arranged in the upper position, while the rear end portion of the board body 31 is supported on the rear support portion 6.

The support pin 34 is detachably supported on the sidewalls 3D of the storage space 3A, and therefore the deck board 30 can be detached when the deck board 30 is not necessary. Further, the deck board 30 can be readily attached when necessary.

As stated above, in the present embodiment, the mechanism for moving the deck board 30 between the upper and lower positions is arranged solely on the deck board 30 side. Therefore, the deck board 30 can be readily mounted in the luggage area 3, without complicated operations for connecting between components on the deck board 30 and components on the luggage area 3.

Further, a simple link mechanism is achieved by using the spring units 5 and the hinge portion 35, instead of a complicated link mechanism. Thereby, the number of components can be reduced.

Moreover, the movement of the deck board 30 is achieved by utilizing the elastic forces of the spring units 5. Thereby, the deck board 30 can be readily put away in the lower position with less effort, and can be readily set in the upper position to separate the luggage area 3 into upper and lower areas.

Embodiment 2

Hereinafter, an embodiment 2 of the present invention will be explained with reference to FIGS. 9 to 11. The present embodiment is a modification of the embodiment 1, in which the construction of the storage space 3A is slightly modified.

Further, in the present embodiment, the support pin 34 is arranged on the front support portion 32 so as to be offset in the thickness direction of the front support portion 32 from the rear(inner) surface thereof, in contrast to the support pin 34 of the embodiment 1 arranged in the front support portion 32.

Figure 9:
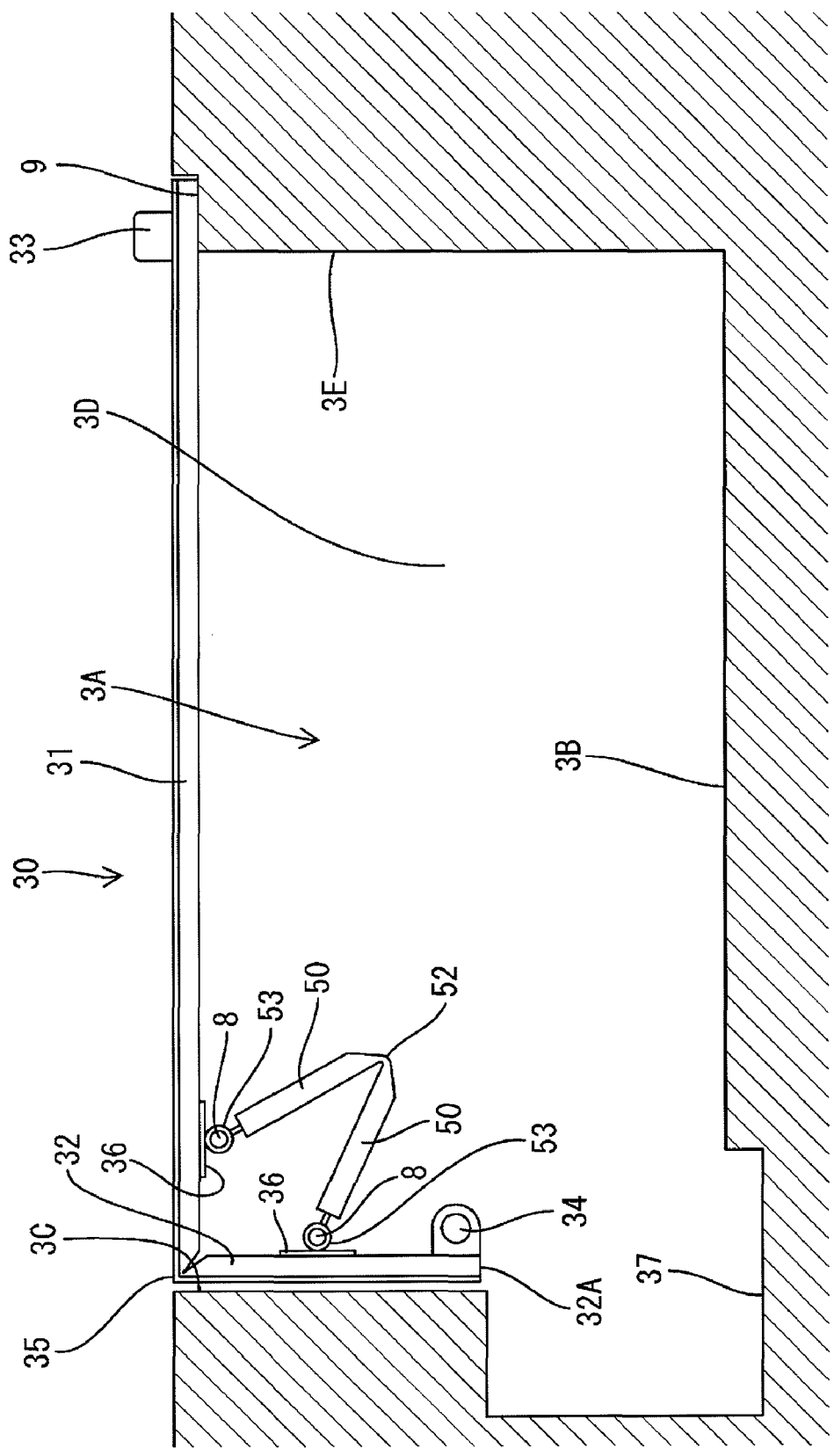
FIG. 9 is a cross-sectional side view showing a deck board arranged in the upper position, according to an embodiment 2.

In the present embodiment, a stepped area is formed on the upper end portion of the rear wall 3E of the storage space 3A, as shown in FIG. 9. The stepped area is provided as a rear support portion 9. That is, the rear wall 3E of the present embodiment provides a flat vertical surface, so as to eliminate a blind spot that is formed below the rear support portion 6 in the embodiment 1.

On the other hand, escape recesses 37, larger than those of the embodiment 1, are provided on the front wall 3C of the storage space 3A, so as to sag forward.

Figure 10:
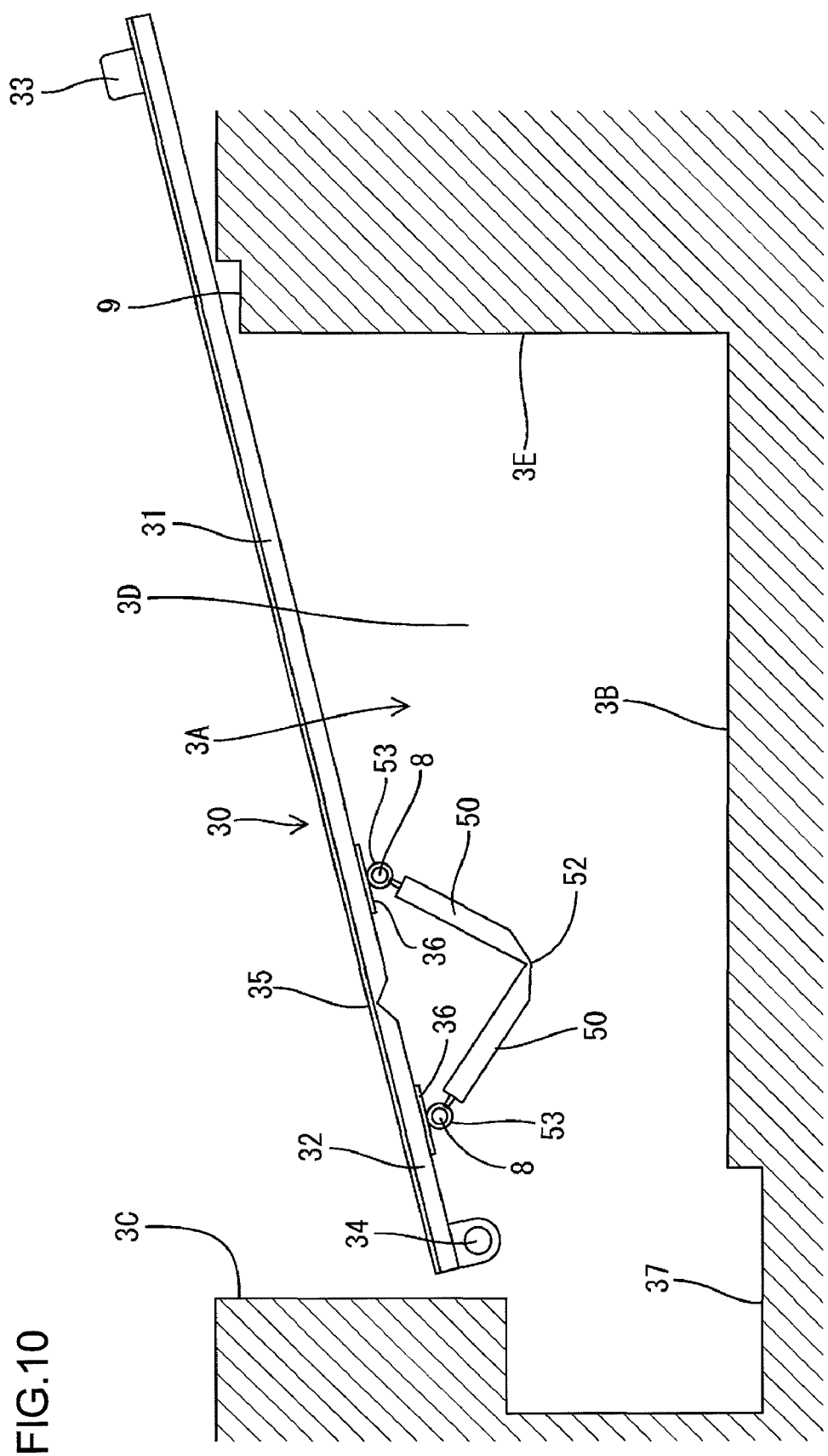
FIG. 10 is a cross-sectional side view showing the deck board that is pulled out so as to form a flat board protruding rearward.
Figure 11:
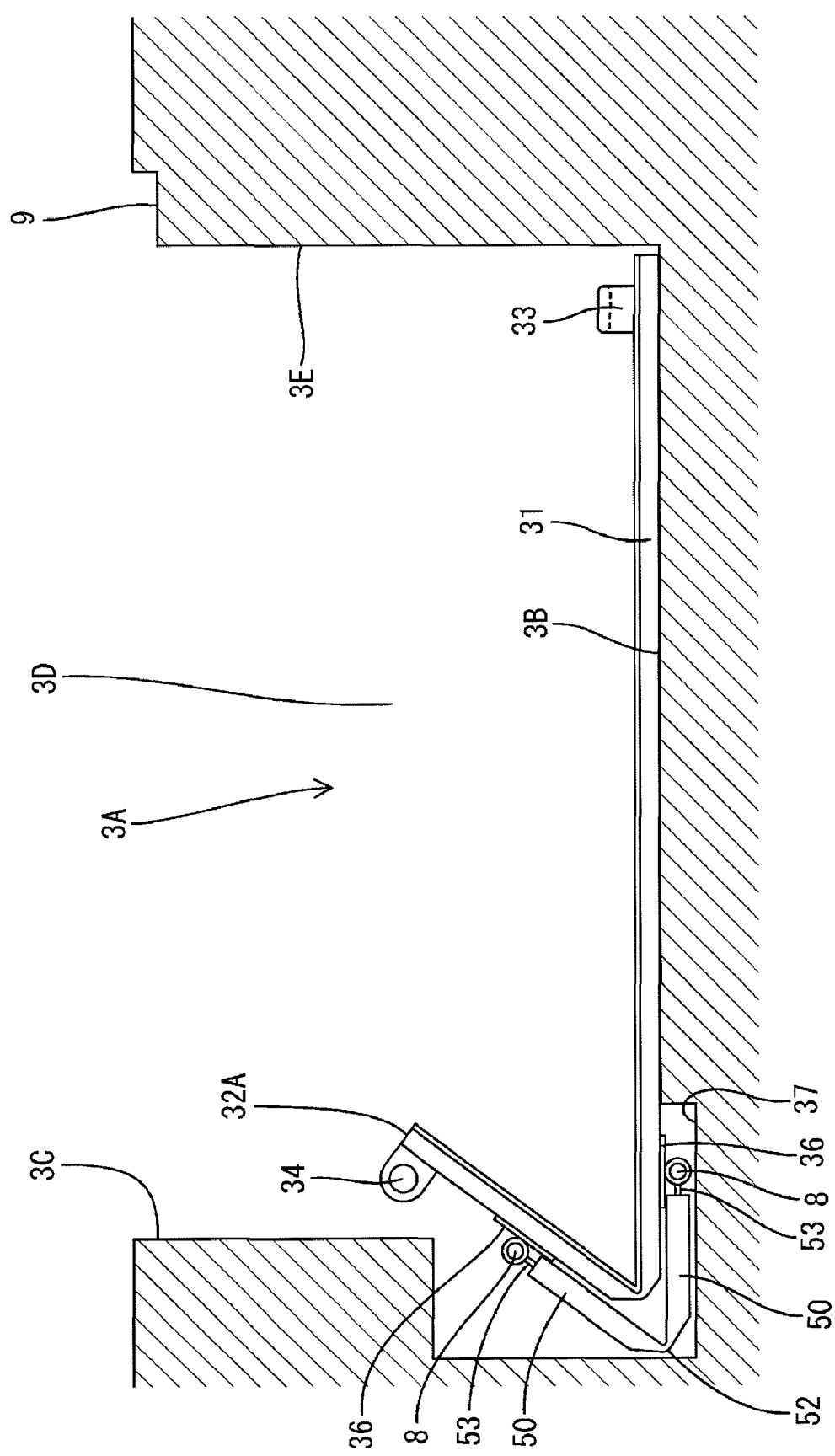
FIG. 11 is a cross-sectional side view showing the deck board arranged in the lower position.

According to the construction, if the deck board 30, arranged in the upper position as shown in FIG. 9, is pulled rearward so as to become flat as shown in FIG. 10, the hinge portion 35 can be thereafter dropped toward the escape recesses 37. When the board body 31 is thereafter released, the deck board 30 is arranged in the lower position as shown in FIG. 11.

When the deck board 30 is set in the lower position, the fore end portion 32A of the front support portion 32 bulges into the storage space 3A so as to hang over the board body 31. At the time, each spring unit 5 is arranged in a V-shape so as to curve along the underside of the deck board 30 and around the hinge portion 35.

The construction of the present embodiment is effective when sufficient space for the rear wall 3E cannot be secured on the rear side of the luggage area 3 (i.e., the rear wall 3E in the present embodiment is arranged more forward than the rear wall 3E in the embodiment 1). Further, the space on the rear side of the rear seats 2 (or specifically, the seat cushions thereof) can be effectively utilized, according to the present embodiment.

Embodiment 3

Hereinafter, an embodiment 3 of the present invention will be explained with reference to FIGS. 12 to 18. A deck board 40 of the present embodiment includes leaf springs 7, instead of the spring units 5 of the embodiment 2.

The constructions similar to those of the embodiment 2 are designated by the same symbols, and explanations for the same constructions, operations and effects thereof are omitted.

The biasing members of the present embodiment are formed of leaf springs 7, which are substantially U-shaped in a free state. Thereby, the number of components of the biasing members is reduced, compared to the spring units 5 of the embodiment 2. The end portions of each leaf spring 7 are connected to the underside surface of the board body 31 and the rear(inner) surface of the front support portion 32, respectively.

Figure 12:
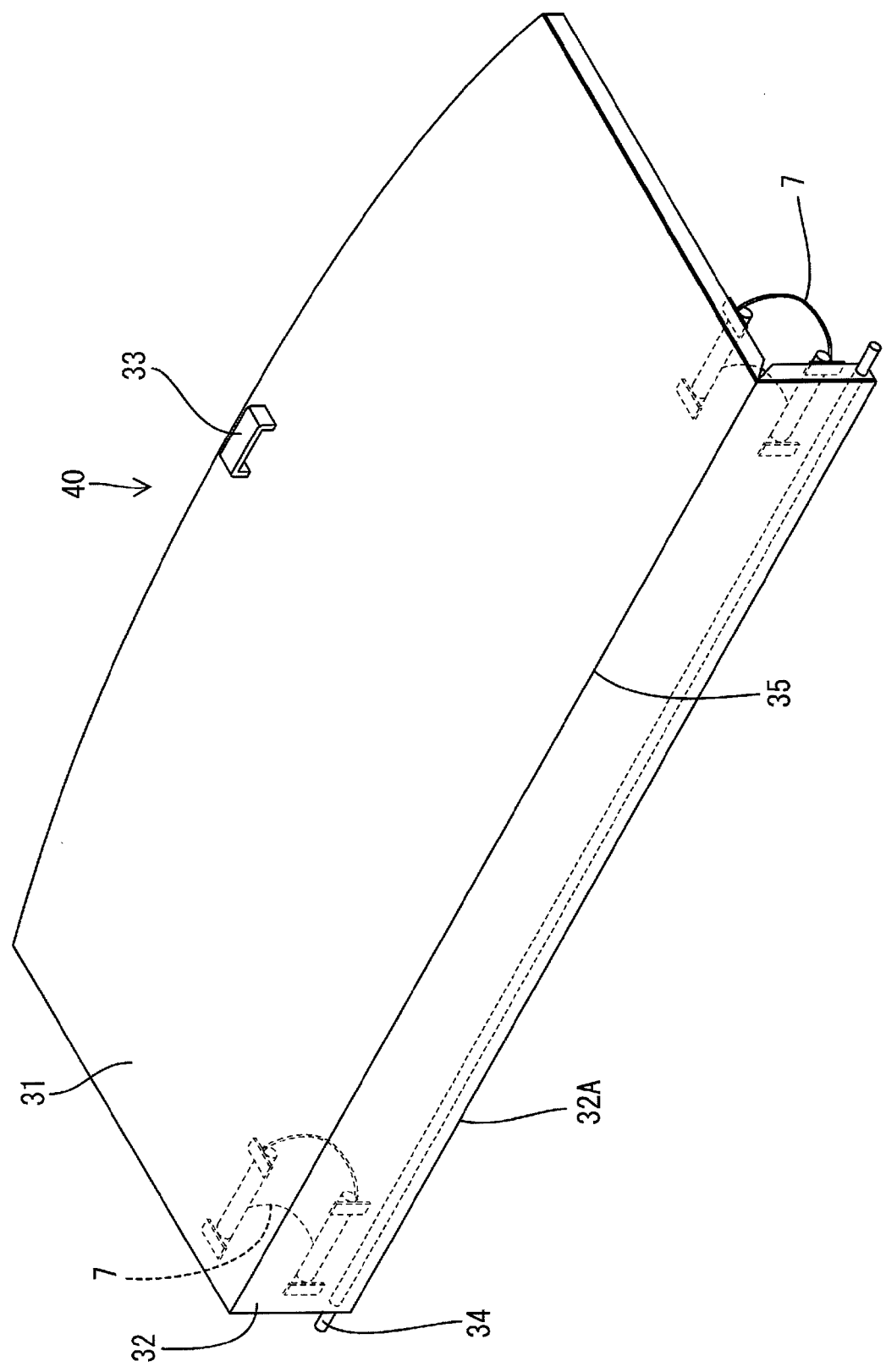
FIG. 12 is a perspective view showing the top surface of a deck board arranged in the upper position, according to an embodiment 3.
Figure 13:
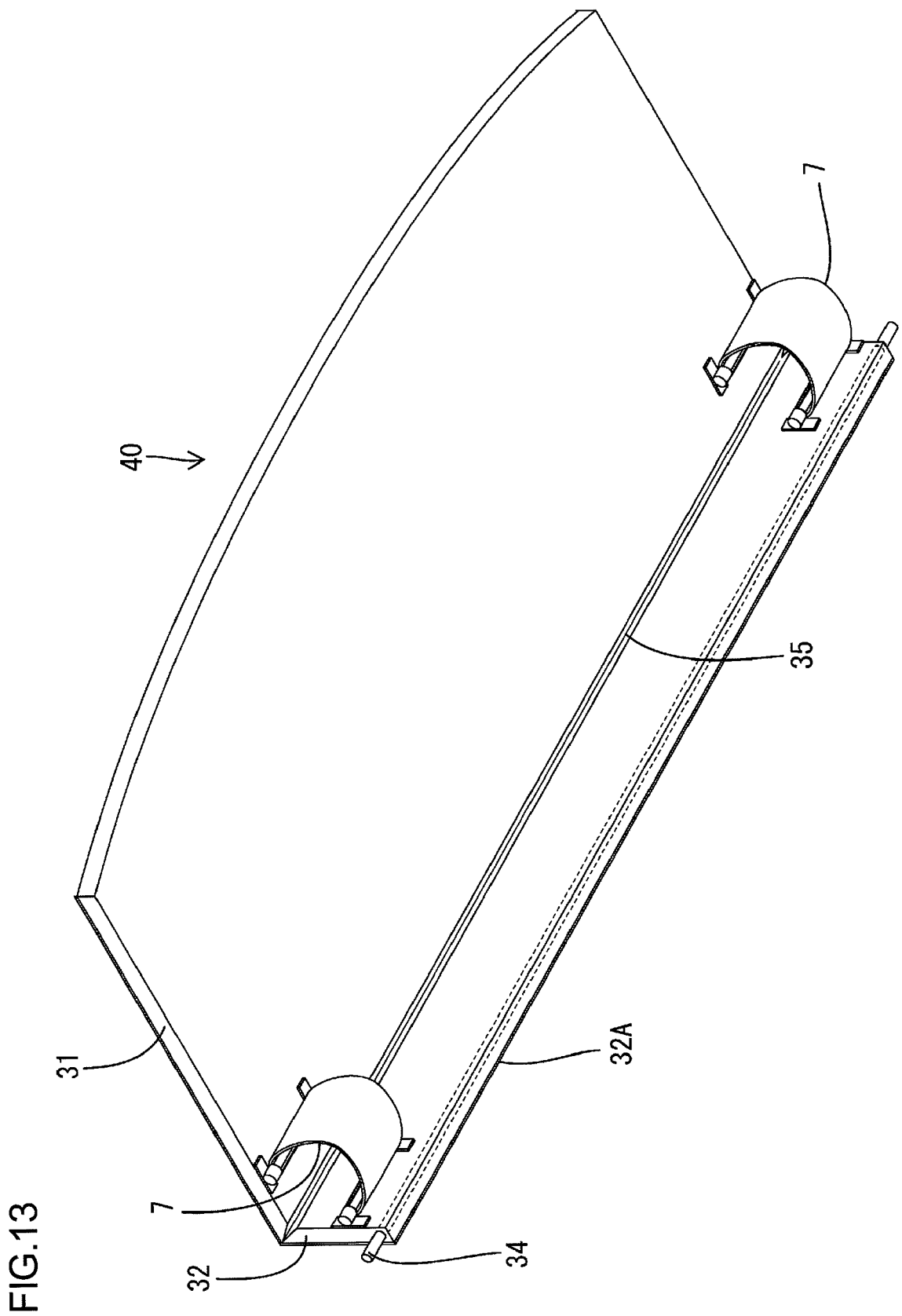
FIG. 13 is a perspective view showing the underside surface of the deck board arranged in the upper position.

When the deck board 40 is arranged in the upper position, the leaf springs 7 are open slightly wider than the free state, as shown in FIG. 12 or 13. Thereby, the underside surface of the board body 31 and the rear(inner) surface of the front support portion 32 are biased to be drawn to each other.

Figure 15:
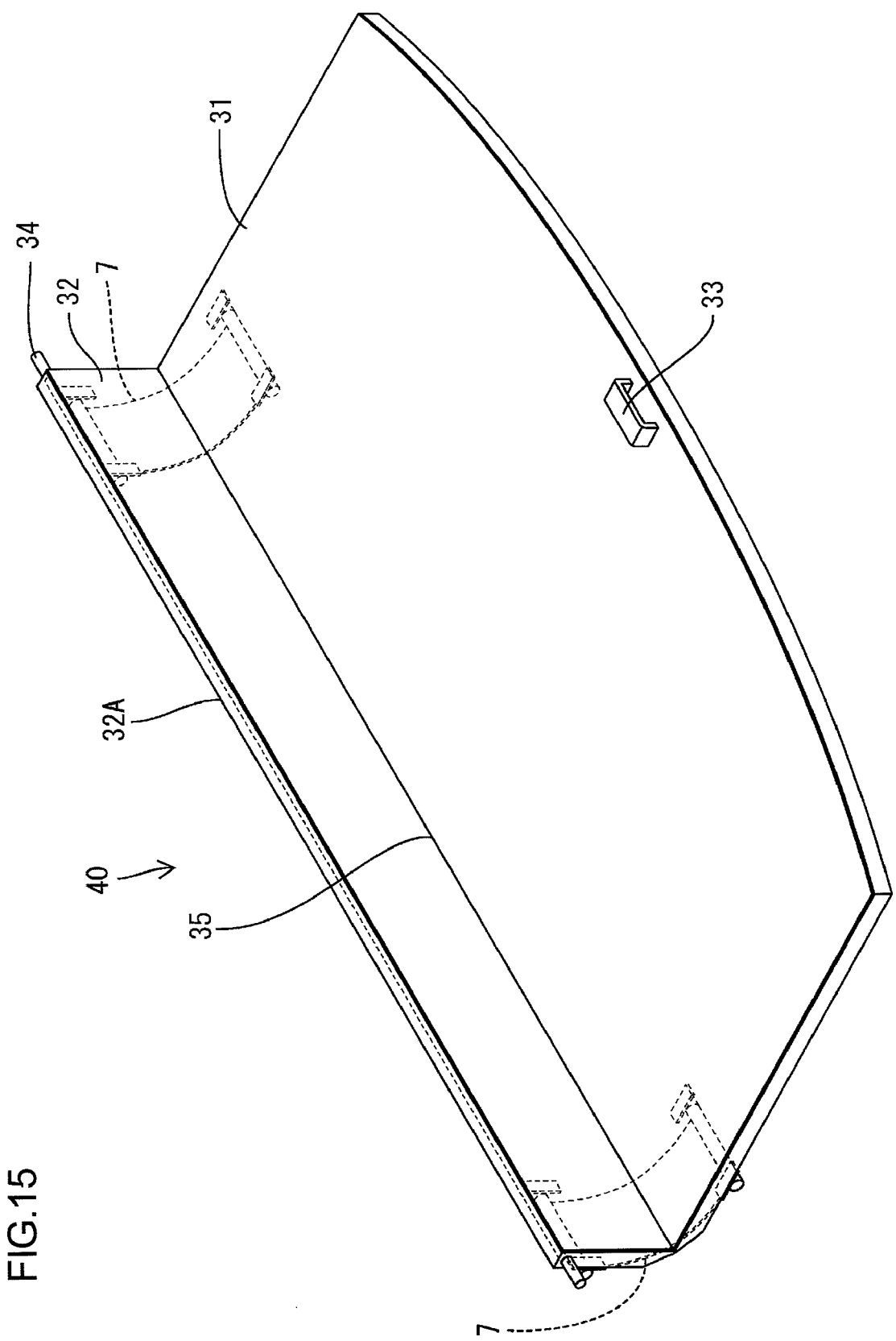
FIG. 15 is a perspective view showing the top surface of the deck board arranged in the lower position.

When the deck board 40 is arranged in the lower position, the leaf springs 7 are open slightly wider than the free state, as shown in FIG. 15. Thereby, the top surface of the board body 31 and the rear(outer) surface of the front support portion 32 are biased to be drawn to each other.

Figure 14:
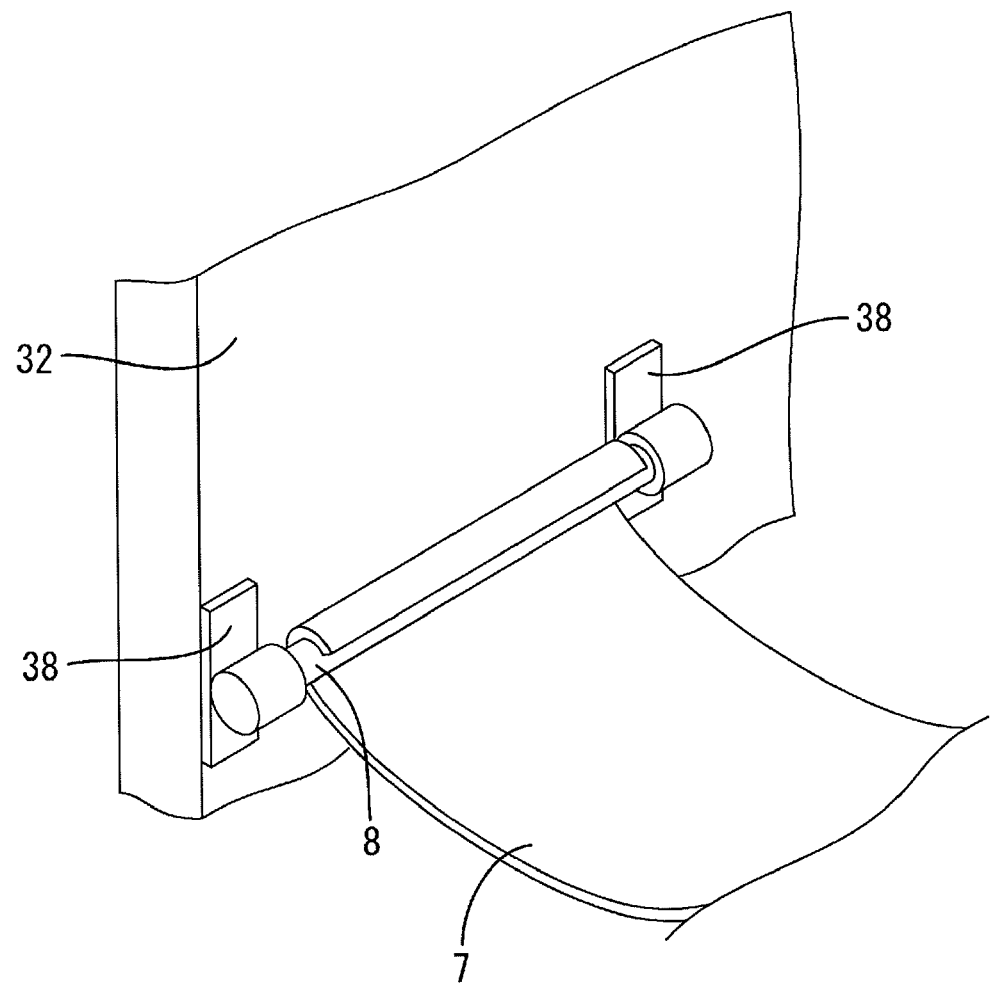
FIG. 14 is a perspective view showing a connecting structure for a leaf spring.

Each end portion of the leaf springs 7 is wrapped around the outer circumferential surface of a support shaft 8, as shown in detail in FIG. 14. The axial end portions of the support shaft 8 are rotatably supported on the rear(inner) surface of the front support portion 32 (or on the underside surface of the board body 31) via support members 38, so that the axial movement of the support shaft 8 is restricted.

Thus, the end portions of each leaf spring 7 are rotatably connected to the rear(inner) surface of the front support portion 32 and the underside surface of the board body 31, respectively.

Figure 16:
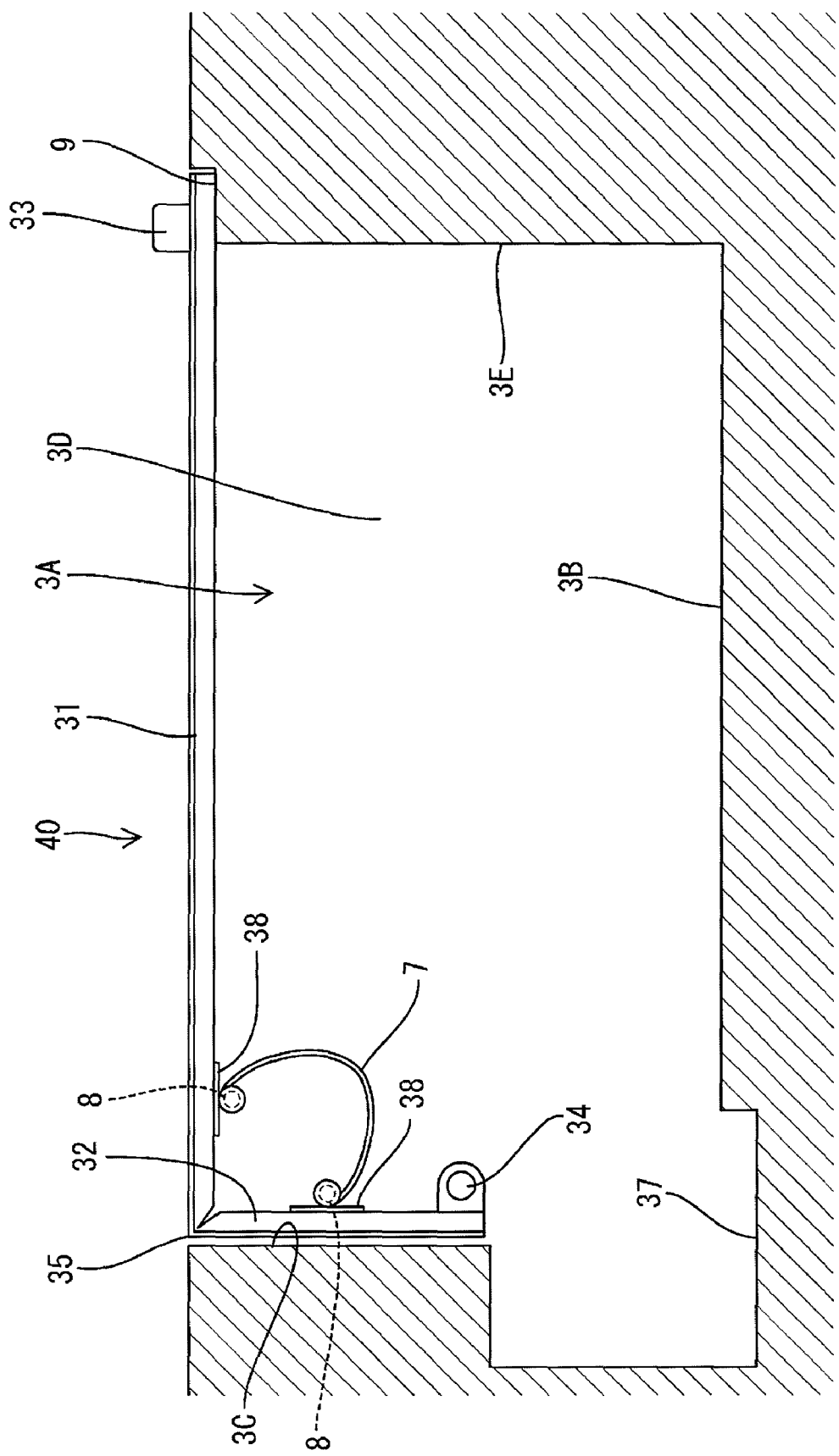
FIG. 16 is a cross-sectional side view showing the deck board arranged in the upper position.
Figure 17:
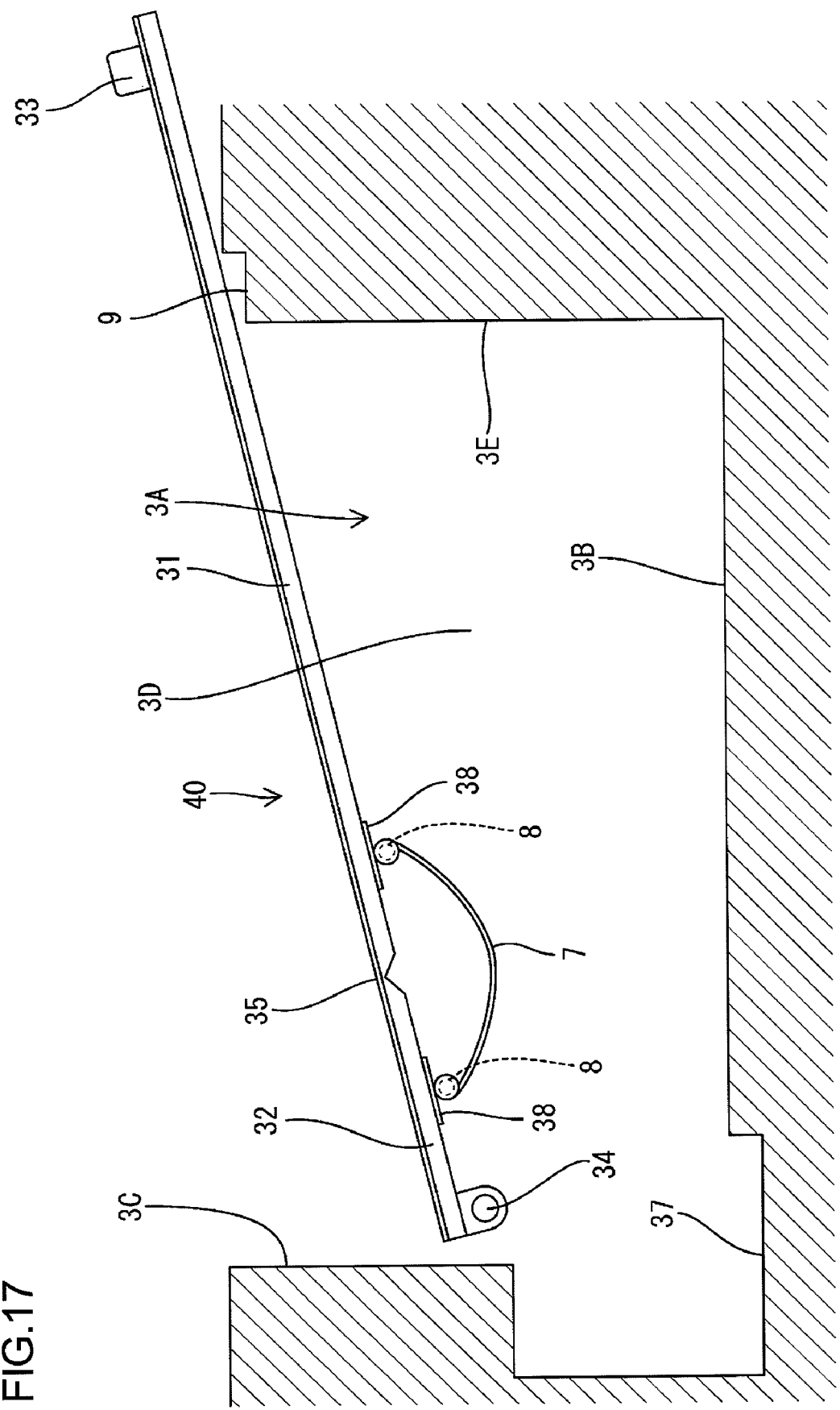
FIG. 17 is a cross-sectional side view showing the deck board that is pulled out so as to form a flat board protruding rearward.
Figure 18:
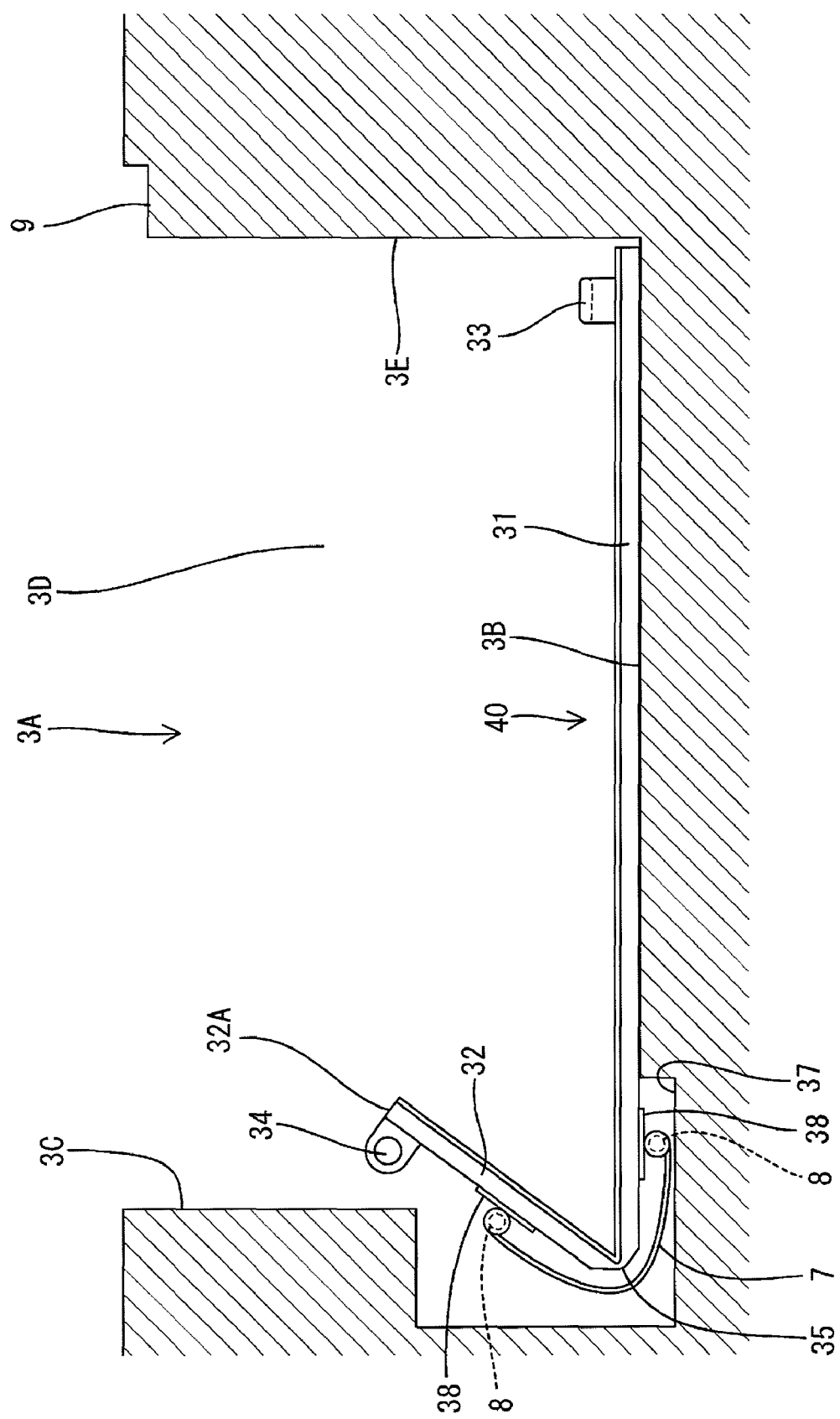
FIG. 18 is a cross-sectional side view showing the deck board arranged in the lower position.

Next, the operation of the deck board 40 will be explained with reference to FIGS. 16 to 18. First, when the deck board 40 is moved from the upper position to the lower position, the handle portion 33 of the deck board 40 in a state shown in FIG. 16 is grasped and pulled rearward so that the board body 31 is pulled out against the elastic forces of the leaf springs 7. Then, the front support portion 32 rotates around the axis of the support pin 34, and the deck board 40 becomes flat as shown in FIG. 17.

Thereafter, the front support portion 32 will continue to rotate due to the inertial force, so that the hinge portion 35 moves to approach the floor 3B. The hinge portion 35 is further pulled toward the floor 3B due to the elastic forces of the leaf springs 7, while the front support portion 32 rotates to approach the front wall 3C of the storage space 3A due to the weight of the board body 31 received via the hinge portion 35.

When the handle portion 33 is thereafter released, the board body 31 rotates around the hinge portion 35 so as to move downward due to its own weight. Consequently, the board body 31 rests on the floor 3B as shown in FIG. 18.

The deck board 40 can be moved from the lower position to the upper position in a similar manner. That is, as described above, the handle portion 33 is pulled upward and rearward, so that the deck board 40 transfers to a state shown in FIG. 17. Then, the hinge portion 35 will continue to rotate due to the inertial force, so as to approach the front wall 3C of the storage space 3A.

Consequently, the front support portion 32 is arranged in a vertical position so as to be along the front wall 3C, further due to the elastic forces of the leaf springs 7. If the handle portion 33 is released, the board body 31 rotates around the hinge portion 35 so as to approach the floor 3B. Then, the deck board 40 is arranged in the upper position, while the rear end portion of the board body 31 is supported on the rear support portion 9.

According to the present embodiment, the biasing members are formed of simple members, i.e., leaf springs 7. Thereby, the number of components can be reduced, compared to the embodiment 1 or 2 that includes spring units 5 as biasing members.

MODIFICATIONS

The present invention is not limited to the embodiments explained in the above description made with reference to the drawings. The following embodiments may be included in the technical scope of the present invention, for example.

(1) In the above embodiments, the support pin 34 is provided on the front support portion 32. However, according to the present invention, support pins 34 may be provided on the respective sidewalls 3D of the luggage area 3 so as to project into the luggage area 3. In this case, receiving portions for the support pins 34 should be provided on the respective lateral sides of the front support portion 32, so that the front support portion 32 is pivotally supported on the support pins 34.

(2) In the above embodiments, the hinge portion 35 is formed of a thinned-out portion so as to have flexibility. However, according to the present invention, connecting members such as hinge braces may be used to connect the board body 31 rotatably to the front support portion 32.

(3) In the above embodiments, the front end portion of the board body 31 is supported by the front support portion 32. However, according to the present invention, a protrusion for supporting the front end portion of the board body 31 may be additionally provided on the front wall 3C of the luggage area 3. In this case, the front support portion 32 is not required to extend along the entire width of the storage space 3A. For example, two front support portions may be provided on the respective lateral sides, so that the protrusion described above can be provided therebetween.

(4) In the above embodiment 1, the spring units 5 are arranged along the underside surface of the deck board 30 and close thereto, when the deck board 30 is set in the lower position. However, according to the present invention, the spring units 5 may be arranged along the underside surface of the deck board 30 so as to bulge from the underside surface, when the deck board 30 is set in the lower position.

(5) In the above embodiment 1, a torsion spring is shown as the spring member 51 of the spring unit 5, for purposes of illustration. However, according to the present invention, a leaf spring may be used instead.

What is claimed is:

1. A deck board comprising:
a board body arranged in a luggage area of a vehicle so as to be capable of being moved between an upper position and a lower position, said board body in the upper position separating said luggage area into upper and lower areas, said board body in the lower position being arranged on a side of a floor of said luggage area;
a guiding member that is rotatably connected to a front end portion of said board body via a hinge portion so as to guide said board body being moved between the upper position and the lower position, wherein an end portion of said guiding member on an opposite side of said hinge portion is pivotally supported by sidewalls on lateral sides of said luggage area via a support pin; and
a biasing member arranged to bias said board body and said guiding member to be drawn to each other across said hinge portion, wherein end portions of said biasing member are rotatably connected to an inner surface of said board body and an inner surface of said guiding member, respectively.

2. A deck board as in claim 1, wherein said biasing member is formed of a spring unit that includes a pair of plate members, which are rotatably connected to each other via a flexible portion, and further includes a spring member arranged to bias said plate members to fold along said flexible portion.

3. A deck board as in claim 1, wherein said biasing member is formed of a leaf spring that is substantially U-shaped in a free state.

4. A deck board as in claim 2, wherein said biasing member includes, as said spring member, a leaf spring that is substantially U-shaped in a free state.

5. A mounting structure of a deck board, comprising:
a deck board as in claim 1; and
a rear support portion provided on a rear wall on a rear side of said luggage area so as to support a rear side of said board body in the upper position;
wherein said support pin is detachably supported on the sidewalls of said luggage area.

6. A mounting structure of a deck board, comprising:
a deck board as in claim 3; and
a rear support portion provided on a rear wall on a rear side of said luggage area so as to support a rear side of said board body in the upper position;
wherein said support pin is detachably supported on the sidewalls of said luggage area.

7. A mounting structure of a deck board, comprising:
a deck board as in claim 4; and
a rear support portion provided on a rear wall on a rear side of said luggage area so as to support a rear side of said board body in the upper position;
wherein said support pin is detachably supported on the sidewalls of said luggage area.

8. A mounting structure of a deck board, as in claim 5, wherein said guiding member is arranged in a vertical position so as to be along a front wall on a front side of said luggage area, when said board body is in the upper position.

9. A mounting structure of a deck board, as in claim 6, wherein said guiding member is arranged in a vertical position so as to be along a front wall on a front side of said luggage area, when said board body is in the upper position.

10. A mounting structure of a deck board, as in claim 7, wherein said guiding member is arranged in a vertical position so as to be along a front wall on a front side of said luggage area, when said board body is in the upper position.

11. A mounting structure of a deck board, as in claim 8, wherein an escape recess is provided at a corner formed by a bottom surface of said luggage area and a front wall of said luggage area, so as to accommodate said biasing member when said board body is in the lower position.

12. A mounting structure of a deck board, as in claim 9, wherein an escape recess is provided at a corner formed by a bottom surface of said luggage area and a front wall of said luggage area, so as to accommodate said biasing member when said board body is in the lower position.

13. A mounting structure of a deck board, as in claim 10, wherein an escape recess is provided at a corner formed by a bottom surface of said luggage area and a front wall of said luggage area, so as to accommodate said biasing member when said board body is in the lower position.

14. A deck board comprising:
a board body arranged in a luggage area of a vehicle so as to be capable of being moved between an upper position and a lower position, said board body in the upper position separating said luggage area into upper and lower areas, said board body in the lower position being arranged on a side of a floor of said luggage area;
a guiding member that is rotatably connected to a front end portion of said board body via a hinge portion so as to guide said board body being moved between the upper position and the lower position, wherein an end portion of said guiding member on an opposite side of said hinge portion is pivotally supported by sidewalls on lateral sides of said luggage area via a support pin; and a biasing member arranged to bias said board body and said guiding member to be drawn to each other across said hinge portion, wherein end portions of said biasing member are rotatably connected to an inner surface of said board body and an inner surface of said guiding member, respectively; and said biasing member is formed of a spring unit that includes a pair of plate members, which are rotatably connected to each other via a flexible portion, and further includes a spring member arranged to bias said plate members to fold along said flexible portion.

15. A mounting structure of a deck board, comprising:

a deck board as in claim 14; and a rear support portion provided on a rear wall on a rear side of said luggage area so as to support a rear side of said board body in the upper position;

wherein said support pin is detachably supported on the sidewalls of said luggage area.

16. A mounting structure of a deck board, as in claim 15, wherein said guiding member is arranged in a vertical position so as to be along a front wall on a front side of said luggage area, when said board body is in the upper position.

17. A mounting structure of a deck board, as in claim 16, wherein an escape recess is provided at a corner formed by a bottom surface of said luggage area and a front wall of said luggage area, so as to accommodate said biasing member when said board body is in the lower position.

18. A mounting structure of a deck board, comprising:

a deck board that includes:

a board body arranged in a luggage area of a vehicle so as to be capable of being moved between an upper position and a lower position, said board body in the upper position separating said luggage area into upper and lower areas, said board body in the lower position being arranged on a side of a floor of said luggage area;

a guiding member that is rotatably connected to a front end portion of said board body via a hinge portion so as to guide said board body being moved between the upper position and the lower position, wherein an end portion of said guiding member on an opposite side of said hinge portion is pivotally supported by sidewalls on lateral sides of said luggage area via a support pin; and a biasing member arranged to bias said board body and said guiding member to be drawn to each other across said hinge portion, wherein end portions of said biasing member are rotatably connected to an inner surface of said board body and an inner surface of said guiding member, respectively; and a rear support portion provided on a rear wall on a rear side of said luggage area so as to support a rear side of said board body in the upper position, wherein:

said biasing member is formed of a spring unit that includes a pair of plate members, which are rotatably connected to each other via a flexible portion, and further includes a spring member arranged to bias said plate members to fold along said flexible portion; and said support pin is detachably supported on the sidewalls of said luggage area.

19. A mounting structure of a deck board, as in claim 18, wherein said guiding member is arranged in a vertical position so as to be along a front wall on a front side of said luggage area, when said board body is in the upper position.

20. A mounting structure of a deck board, as in claim 19, wherein an escape recess is provided at a corner formed by a bottom surface of said luggage area and a front wall of said luggage area, so as to accommodate said biasing member when said board body is in the lower position.

* * * * *

UNITED STATES PATENT AND TRADEMARK OFFICE
CERTIFICATE OF CORRECTION

| | | |
|---|---|---|
| PATENT NO. | : 7,950,712 B2 | Page 1 of 1 |
| APPLICATION NO. | : 12/359644 | |
| DATED | : May 31, 2011 | |
| INVENTOR(S) | : T. Karaki et al. | |

It is certified that error appears in the above-identified patent and that said Letters Patent is hereby corrected as shown below:

At column 10, line 51, (claim 13, line 1) "Amounting" should read -- A mounting --.

At column 11, line 22, (claim 16, line 1) "Amounting" should read -- A mounting --.

At column 12, line 27, (claim 19, line 1) "Amounting" should read -- A mounting --.

Signed and Sealed this
Third Day of January, 2012

David J. Kappos
*Director of the United States Patent and Trademark Office*